J. W. SMITH.
INTERNAL COMBUSTION ENGINE.
APPLICATION FILED JAN. 4, 1912.

1,214,837.

Patented Feb. 6, 1917.
3 SHEETS—SHEET 3.

WITNESSES

INVENTOR
John W. Smith

UNITED STATES PATENT OFFICE.

JOHN W. SMITH, OF CHICAGO, ILLINOIS.

INTERNAL-COMBUSTION ENGINE.

1,214,837.  Specification of Letters Patent.  Patented Feb. 6, 1917.

Application filed January 4, 1912. Serial No. 669,470.

*To all whom it may concern:*

Be it known that I, JOHN W. SMITH, a citizen of the United States, residing at Chicago, in the county of Cook and State of Illinois, have invented a certain new and useful Improved Internal-Combustion Engine, of which the following is a full, clear, concise, and exact description, reference being had to the accompanying drawings, forming a part of this specification.

My invention relates to new and useful improvements in the crank connection for gas engines, and more particularly to a crank connection for a gas engine having the cylinders arranged radially of the crank case.

An object of the invention is to provide a simple and efficient crank connection wherein a plurality of piston rods are connected to the same crank and have free movement relative to the crank without binding and without interfering with each other.

In the drawings:—

Figure 1:
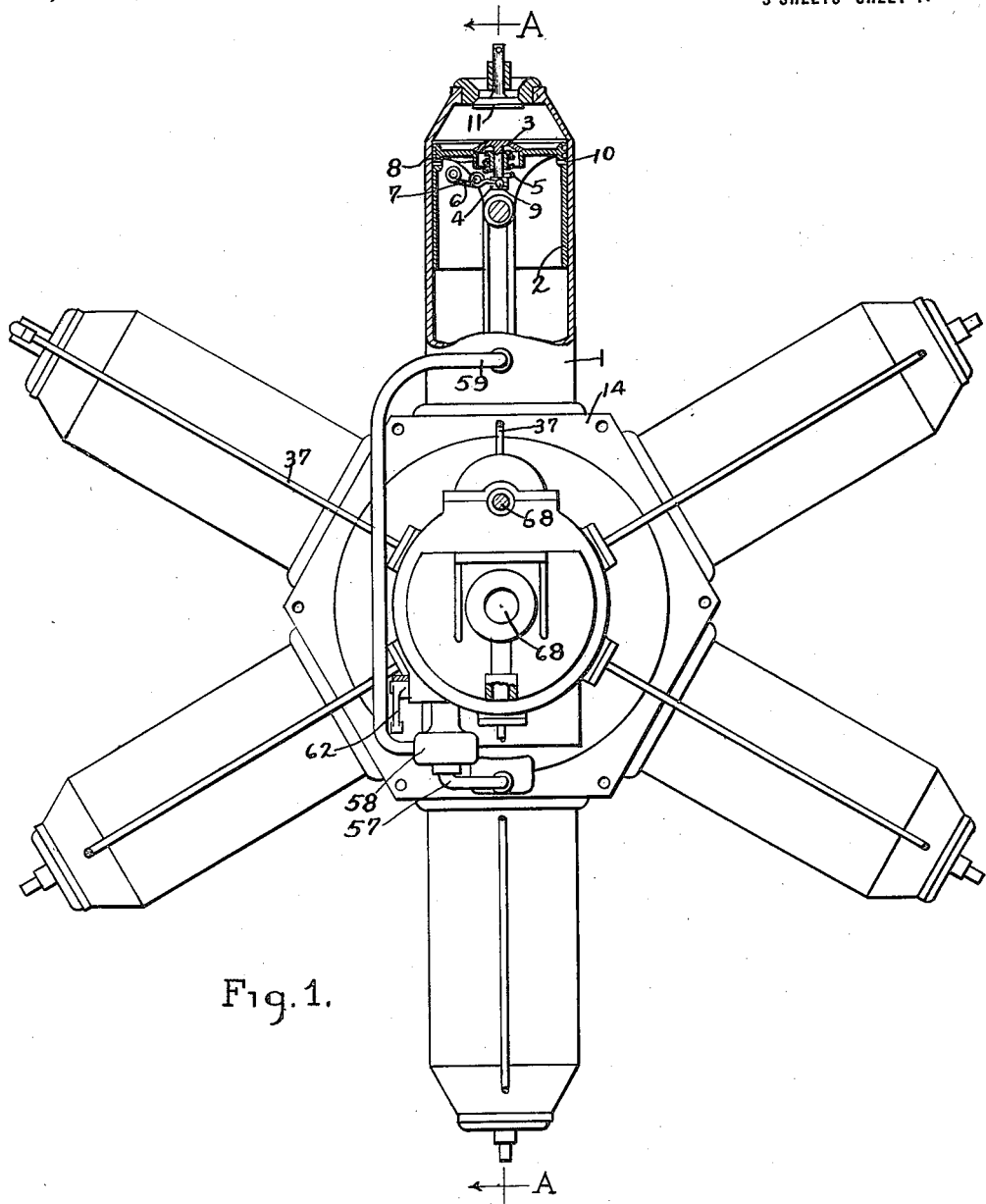
Figure 1 is a view showing, partly in end elevation and partly in section, an engine to which my invention has been applied.

The invention, as shown, is applied to an engine having a crank case and a plurality of radially disposed cylinders which are mounted thereon. Extending through the crank case is a one-piece shaft which has opposed cranks. On each crank is a ball bearing, the outer member of which consists of a freely mounted ring. In each cylinder is a piston and a pitman rod coöperates therewith. The pitman rods of certain of the cylinders are connected with one crank, while the pitman rods of the other cylinders are connected with the other crank. Each pitman rod has an enlarged concave surface which has a sliding engagement with the periphery of the respective ball bearing ring so that the thrust on the pitman rod is brought directly against the ball bearing ring and through the balls of the bearing against the crank. Said pitmen are held in engagement with the ball bearing ring by depending lips and a retaining ring.

Referring more in detail to the drawings:—

The engine to which my invention is applied consists of a crank case 14 in which is mounted a shaft 13 having two opposed cranks $13^a$ and $13^b$. The shaft 13 is mounted in a sleeve bearing 66 and a ball bearing 23 which is held in place by a ring 24. On the crank $13^a$ there is a ball bearing which consists of a series of balls 20 and a coöperating ball bearing ring $20^a$. The balls 20 run in a groove $20^c$ formed in an inner sleeve or ring $20^b$ which is mounted on the crank $13^a$. Mounted on the crank $13^b$ is a similar ball bearing having an outer ring $20^a$ and an inner ring $20^b$ which is formed with a groove $20^c$ for the balls 20. These ball bearings may be held in place on their respective cranks in any suitable way.

The crank case 14, as herein shown, carries six cylinders which are indicated at 1, 2, 3, 4, 5 and 6 in Fig. 1 of the drawings. These cylinders, as clearly shown in the drawings, are arranged radially about the crank casing and are secured thereto in any suitable way. These cylinders also, as shown in the drawings, are arranged with their centers in a single plane at right angles to the axis of the shaft 13. Each cylinder is provided with a piston, one of which is indicated at 7 in Fig. 1 of the drawings, and connected to each piston is a pitman rod 15. The pitman rods of alternate cylinders, that is, of the cylinders 1, 3 and 5, are connected to the crank $13^a$, while the pitman of the cylinders 2, 4 and 6 are connected to the crank $13^b$. Each pitman is pivotally attached to its corresponding piston by a pivot pin 12. Each pitman is also attached to the piston at a center point in the cylinder so that the points of connections of all the pistons with their respective pitmen lie in the same plane. The pitmen are alternately deflected so that the inner ends or extremities of one group lie in one plane, while the inner ends or extremities of the other group lie in another plane, and these two planes intersect the ball bearings of the respective cranks to which the pitmen are connected.

Figure 3:
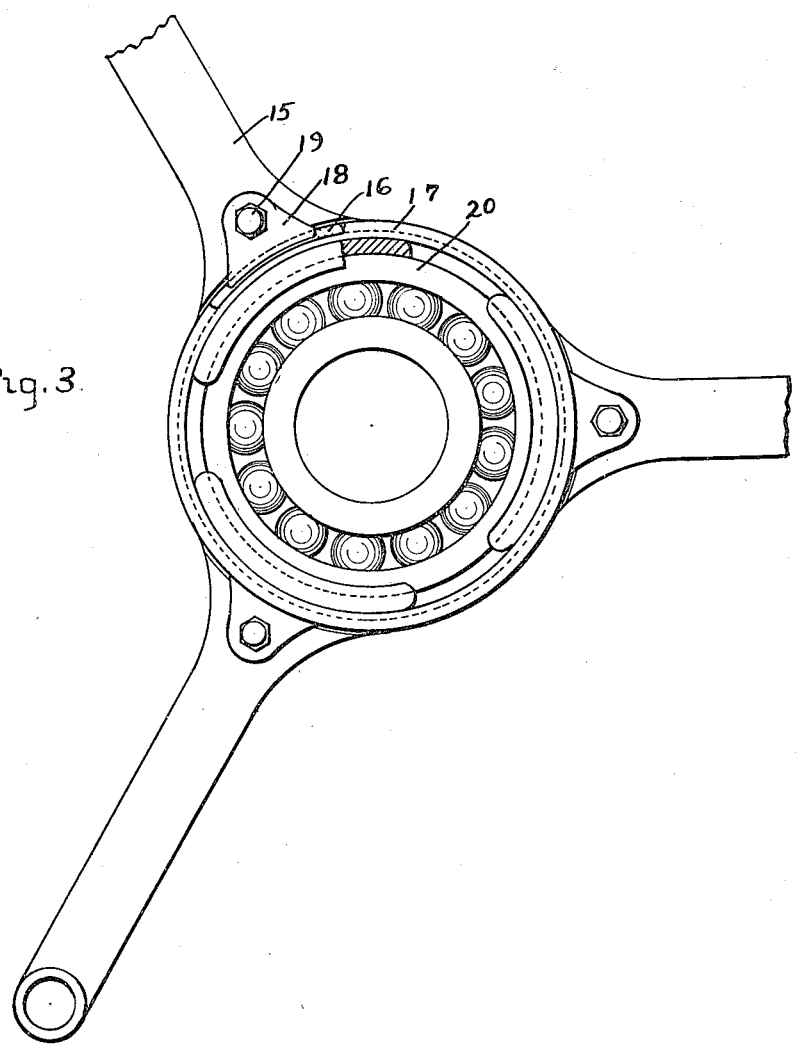
Fig. 3 is a view, partly in side elevation and partly in section, showing one crank and the pitman rods connected thereto.

Each pitman has an enlarged inner end, indicated at $15^a$ in the drawings, and the inner face of this enlarged end is concaved, as at $15^b$, so as to fit the outer periphery of the outer ring $20^a$ of the ball bearing to which it is attached. At each side of the enlarged end of the pitman 15 there is a depending lip 15ᶜ which overlaps the ring 20ᵃ and prevents the piston from moving laterally relative to the ring. As clearly shown in Fig. 3 of the drawings, the extended ends of the pitmen form segments of a circle, but the combined length of these segments is less than the entire circumference of the circle so that one pitman may slide freely circumferentially on the ring 20ᵃ without engaging another pitman.

Figure 2:
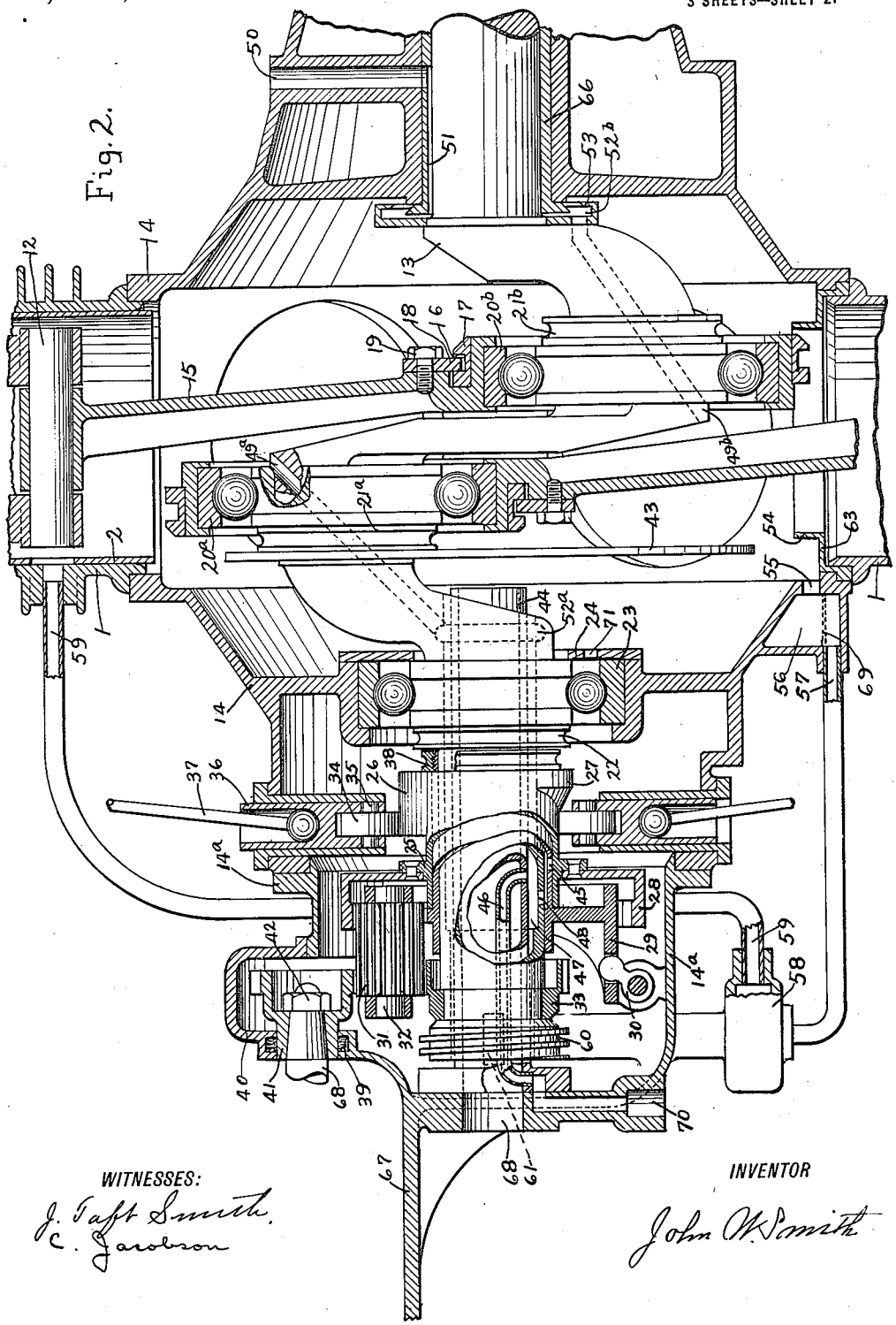
Fig. 2 is a sectional view on the line A—A of Fig. 1, showing a portion only of the cylinder.

The pitmen are held in engagement with the rings to which they are attached by a retaining ring 17. This retaining ring 17 is held in place by a clamping lug 18 which is secured to the pitman by a bolt 19. This retaining ring has a groove to receive the locking lug 18, as clearly shown in Fig. 2 of the drawings.

From the above description, it will be apparent that I have provided a crank connection wherein each pitman is connected to its respective crank by a connection solely with the outer ring of a ball bearing interposed between the pitman and the crank. This connection between the pitman and the outer ring of the ball bearing is such as to permit the pitman to slide freely on the ring. The end thrust of the pitman rod is brought to bear directly on the ring and through the balls against the crank. The pitmen are held in free sliding engagement with this ring of the ball bearing by the retaining ring. It will be noted that this connection is very simple and durable, with no resulting binding action between the parts.

It is obvious that minor changes in the details of construction and the arrangement of parts may be made without departing from the spirit of this invention, as set forth in the appended claims.

Having thus described the invention, what I claim as new and desire to secure by Letters-Patent is:—

1. An internal combustion engine including in combination, a crank case, a plurality of radially disposed cylinders mounted thereon and disposed substantially in the same plane, a one-piece shaft having opposed cranks disposed in separate planes and mounted in said case, a ball bearing for each crank, the outer member of which consists of a freely mounted ring, a piston for each cylinder, a pitman rod coöperating therewith, alternate pitmen being connected to the respective cranks, each pitman rod having an enlarged concave bearing surface having sliding engagement with the periphery of its respective ball bearing ring, and a retaining ring for holding the ends of the rods in engagement with the ring of the ball bearing.

2. An internal combustion engine including in combination, a crank case, a plurality of radially disposed cylinders mounted thereon, a one-piece shaft having opposed cranks mounted in said case, a ball bearing for each crank, the outer member of which consists of a freely mounted ring, a piston for each cylinder, a pitman rod coöperating therewith, each pitman rod having an enlarged concave bearing surface having sliding engagement with the periphery of its respective ball bearing ring, a depending lip overlapping the ring and preventing the rod from lateral movement relative to the ring, and a retaining ring for holding the ends of the rods in engagement with the ring of the ball bearing.

In witness whereof, I hereunto subscribe my name this 2nd day of January, A. D. 1912.

JOHN W. SMITH.

Witnesses:
 AUSTIN H. PARKER,
 H. K. HERWITZ.